(12) United States Patent
Haber

(10) Patent No.: US 7,395,958 B2
(45) Date of Patent: Jul. 8, 2008

(54) CONDUCTING MONETARY TRANSACTIONS WITH MINIMAL COIN TRANSFER

(75) Inventor: Antoine A. Haber, Los Angeles, CA (US)

(73) Assignee: Piggy Card, LLC, Beverly Hills, CA (US)

( * ) Notice: Subject to any disclaimer, the term of this patent is extended or adjusted under 35 U.S.C. 154(b) by 86 days.

(21) Appl. No.: 11/101,490

(22) Filed: Apr. 8, 2005

(65) Prior Publication Data
US 2006/0010068 A1 Jan. 12, 2006

Related U.S. Application Data

(60) Provisional application No. 60/585,605, filed on Jul. 7, 2004.

(51) Int. Cl.
*G07F 19/00* (2006.01)
(52) U.S. Cl. .................... 235/379; 235/380; 235/383; 235/492; 705/39
(58) Field of Classification Search ................ 235/493, 235/378, 379, 380, 383, 385, 492; 705/39
See application file for complete search history.

(56) References Cited

U.S. PATENT DOCUMENTS 5,650,761 A * 7/1997 Gomm et al. ............... 235/381
6,119,946 A * 9/2000 Teicher ...................... 235/492
6,764,001 B1 * 7/2004 Kawai et al. ................ 235/380
6,857,562 B2 * 2/2005 Sasaki ........................ 235/379
2002/0025796 A1 * 2/2002 Taylor et al. ................ 455/406

FOREIGN PATENT DOCUMENTS

EP 0854460 A2 * 7/1998

* cited by examiner

*Primary Examiner*—Seung H Lee

(57) ABSTRACT

When a monetary transaction is made between a merchant and a customer, some or all of the change owed to the customer will be transferred to a data storage card carried by the customer. Instead of receiving the change in the form of coins, the customer instead would insert his/her data storage card into a Point-of-Sale (POS) terminal, and the change amount owed to the customer would be credited on the card (minus a service charge). The card can be repeatedly used at all participating merchants, so that credited change accumulates thereon, with a running credit balance being maintained on the card. Information pertaining to each transaction is automatically transferred from the POS terminal to a central data storage facility of the card issuer which maintains a record of the customer's credit balance. The customer can be reimbursed part or all of his/her balance (less a fee) in the form of cash, or the customer can use the card as a debit card. Funds are transferred from the participating merchants to the card issuer to be held as custodian for the customer until the customer withdraws, transfers or otherwise takes possession of the funds.

18 Claims, 4 Drawing Sheets

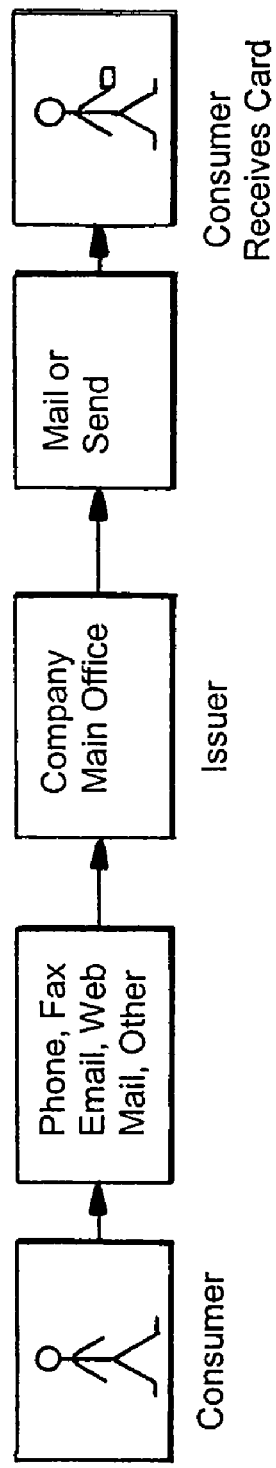
1. Consumer Receives Data Storage Card
FIG. 1A
FIG. 1B

CONDUCTING MONETARY TRANSACTIONS WITH MINIMAL COIN TRANSFER

This application claims the benefit of U.S. Provisional Application Ser. No. 60/585,605 filed on Jul. 7, 2004.

BACKGROUND

The present invention relates to a commercial retail transaction system and method, for conducting monetary payment transactions with a minimal use of coins.

The occurrence of retail transactions in which a purchaser pays in cash, often results in the return of bills and coins. Coins accumulate in the possession of customers, stored in containers, many become lost.

In an attempt to solve that problem, coin-return facilities have been established at which customers can return coins in exchange for cash or vouchers. However, that requires that customers collect and transport their accumulated coins, often quite heavy, to the coin-return facility.

It has also been proposed in U.S. Pat. No. 5,869,826 that customers purchase a magnetic stripe data card which stores a coin balance, e.g., up to ninety-nine cents. The customers can use such a coin card in place of coins when making a purchase. The card would interface with a point-of-sale (POS) terminal which calculates the remaining value of the card. However, the use of such cards requires that customers conduct repeated transactions in order to purchase new coin cards.

SUMMARY OF THE INVENTION

In a method for conducting a monetary transaction wherein a customer is owed change at a merchant's establishment, the improvement comprising the steps of:

A) causing the customer's data storage card to be read by a reader at the merchant's establishment; and B) causing the customer to be credited with all or some of the change that is owed the customer, and recording the credited change on the data storage card.

BRIEF DESCRIPTION OF THE DRAWINGS

The objects and advantages of the invention become apparent from the following detailed description of preferred embodiments thereof in connection with the accompanying drawings in which like numerals designate like elements and in which:

FIG. 1A schematically depicts how a customer request and obtains a data storage card.

FIG. 1B schematically depicts how data storage-cards can be distributed to customers.

DESCRIPTION OF A PREFERRED EMBODIMENT

Figure 2:
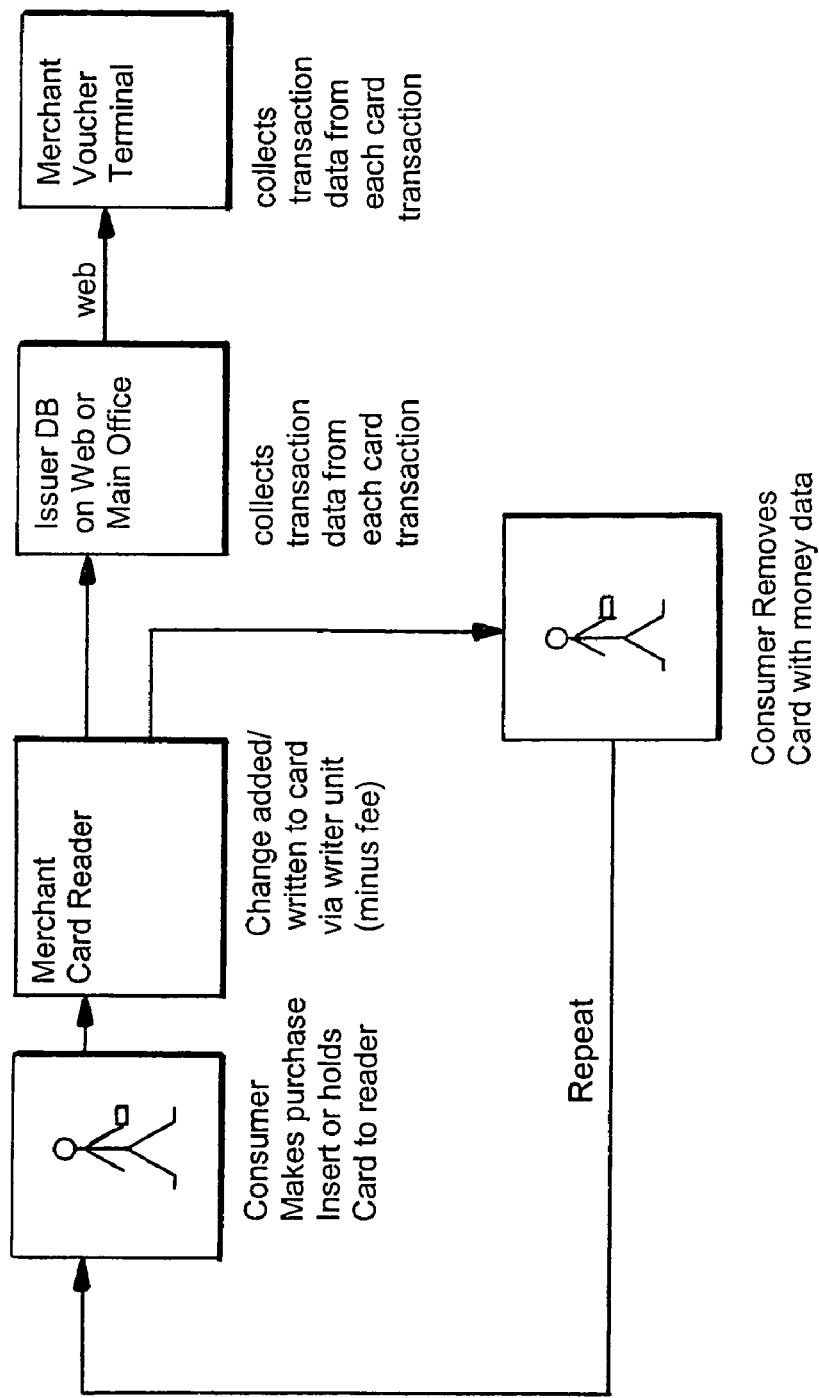
FIG. 2 schematically depicts how the customer accumulates money on the data storage card.
Figure 3:
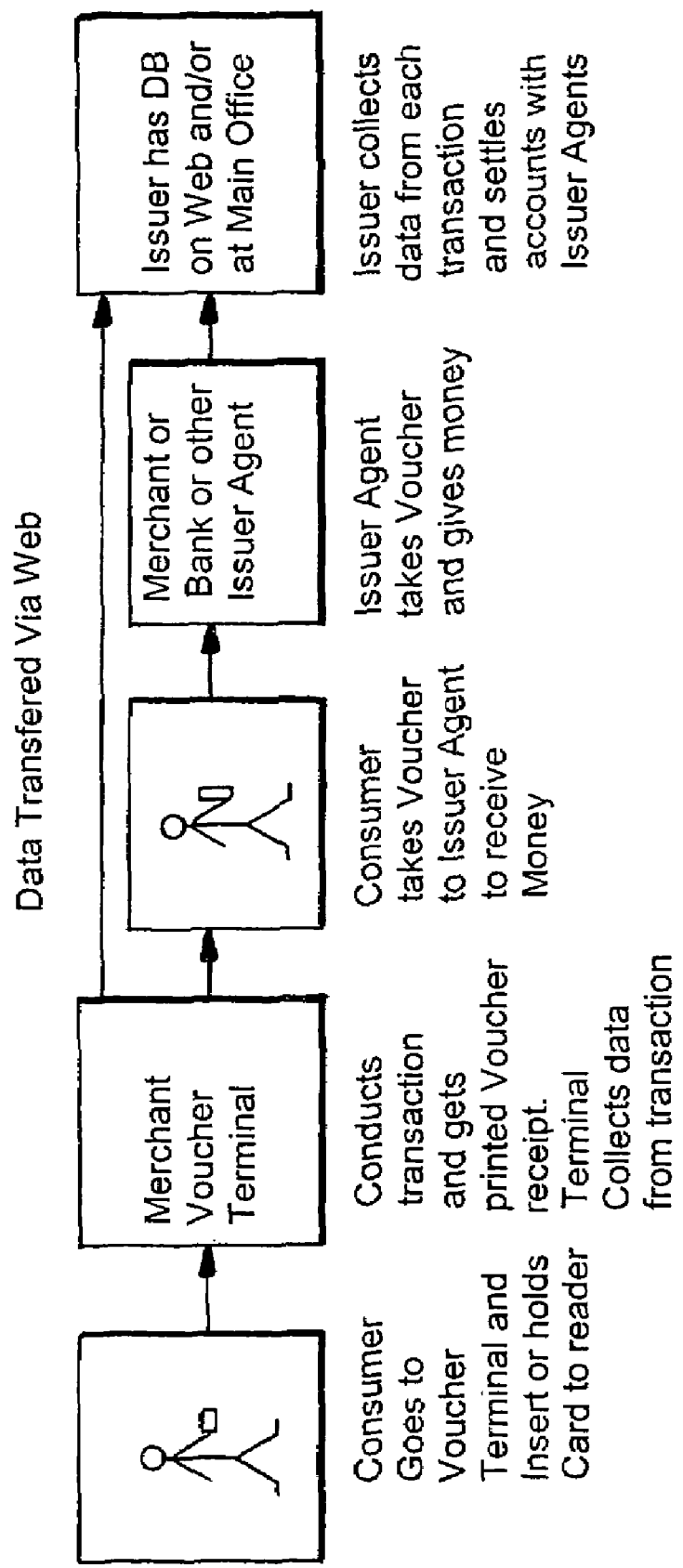
FIG. 3 schematically depicts how the customer receives money using the data storage card.

With the present invention, a customer obtains a data storage card, which can be used at participating merchants. The customer can present the card to a merchant at a check-out station. In the event that a purchase results in the customer being owed change, the data storage card is read by a reader located at the merchant's establishment, and some or all of the change owed the customer is recorded on the card.

The card can be repeatedly used at participating establishments, so that credited change accumulates thereon, with a running credit balance being maintained on the card.

Information pertaining to each transaction is transferred to a central data storage facility of the card issuer, e.g., by the merchant, or it can be automatically transferred from the POS (point-of-sale) terminal to a central data storage facility of the card issuer which maintains a record of the customer's credit balance.

The customer can access or "cash-in" some or all of his/her credit balance in one of a number of ways. For example, the customer could contact the data storage facility over the internet or by telephone, using a password or a toll-free telephone number. Then, by keying or dialing-in a special PIN number, the customer can request that all or some of the balance be sent to him/her by check or directly sent to a bank account.

Alternatively, cash-in terminals could be located at participating merchants into which the customer could insert the data storage card in order to receive some or all of his/her credit balance in the form of cash or vouchers usable as currency at participating merchants.

Moreover, the holder of a data storage card could use the card as a debit card in certain payment machines, such as pay telephones and parking meters, vending machines etc., which accept data storage cards for payment.

When a customer receives credit on the data storage card, a fee or service charge is automatically deducted from the amount being credited. The fee, which could comprise a set percentage of the amount credited, goes to the card issuer. The card issuer, in turn, pays a fee to the participating merchants which keep track of the change values transmitted by them to the customer's data storage card at the time of purchase. Instead of deducting the fee at the time of making the credit, the fee could be deducted when the customer uses the card to receive money.

The data storage card could be distributed to anyone who wants one. There need be no age requirement, limited application process, and no extra fee to own the card, making its circulation extremely simple. The card could be distributed through participating merchants, such as supermarkets, offering the data storage card as an added benefit to their services. The card can be distributed by mailing in response to a phone call to a toll-free telephone number or even accessed over the internet. Alternatively, the cards could be given out by participating merchants. The card can be activated in the same manner, e.g., over the phone or the internet. Each card could be provided with an individual bar code and secret PIN number which identifies the particular card owner. When customers receive their card, they could, for example, call a toll-free number provided on the back of the card, or access an internet site to activate the card by providing their name, address and individual secret PIN number.

The data storage card itself can be any standard smart card which contains a micro chip (SIM chip), or it could be similar to a standard credit card having a magnetic strip. Such electronic and magnetic data storage cards are well known, as are the terminals (readers) that are able to "read" the card and transmit data from the card to a distant site.

An example of the way the data storage card could be used will be explained below with reference to the accompanying figures. With reference to FIGS. 1A and 1B, a customer obtains a data storage card either by requesting it directly from the card issuer (option 1—FIG. 1A) or by being given one by a merchant or at hand-out locations (option 2—FIG. 1B) and takes the card to a participating merchant (FIG. 2), such as a supermarket, for example, where the customer makes a cash purchase entitling him/her to receive change at a check-out station. Instead of receiving the change, the customer places his/her data storage card into a card reader such as a land-line POS, or adjacent a wireless (RF) terminal, and inserts his/her PIN (personal identification number). The requirement for a PIN is desirable, but could be dispensed with. The cashier then actuates a change button which signals to the terminal the amount of change due, and the amount to be credited (at the customer's discretion) to the data storage card. Simultaneously, information concerning the transaction is sent to a data storage facility of the card issuer, e.g. via cell phone, radio frequency or land line, and also to the participating merchant.

In order to avoid having to make considerable modifications to existing cash registers, it may be preferable that the system function such that the customer/customer have only three choices, i.e. (1) none of the change is credited to the card, (2) all of the change is credited to the card, or (3) only all of the coins (i.e., non-bills) are credited to the card. For example, if the change owed is $1.25, the customer could elect to have all $1.25 credited to the card, or only the 25 cents. If the change owed is 25 cents, then the customer could elect to have only the 25 cents credited. Of course, a system could be designed where the customer elects to have any portion of the change credited to the card. At this time, the fee or user charge would be automatically deducted.

The customer, usually after accumulating value on the data storage card by repeating the above-described transaction, can redeem some or all of the stored value by taking the card to a voucher dispenser at a participating merchant, bank, or other agent, inserts the card and PIN number, and instructs the dispenser to dispense a voucher having a value equal to all or part of the accumulated credit on the card. The voucher dispenser would be in communication with the main office which records the transaction and deducts the fee or service charge.

Instead of using the voucher to make a purchase, the user can take the voucher to a participating merchant or other redeeming agent to receive cash.

Figure 4:
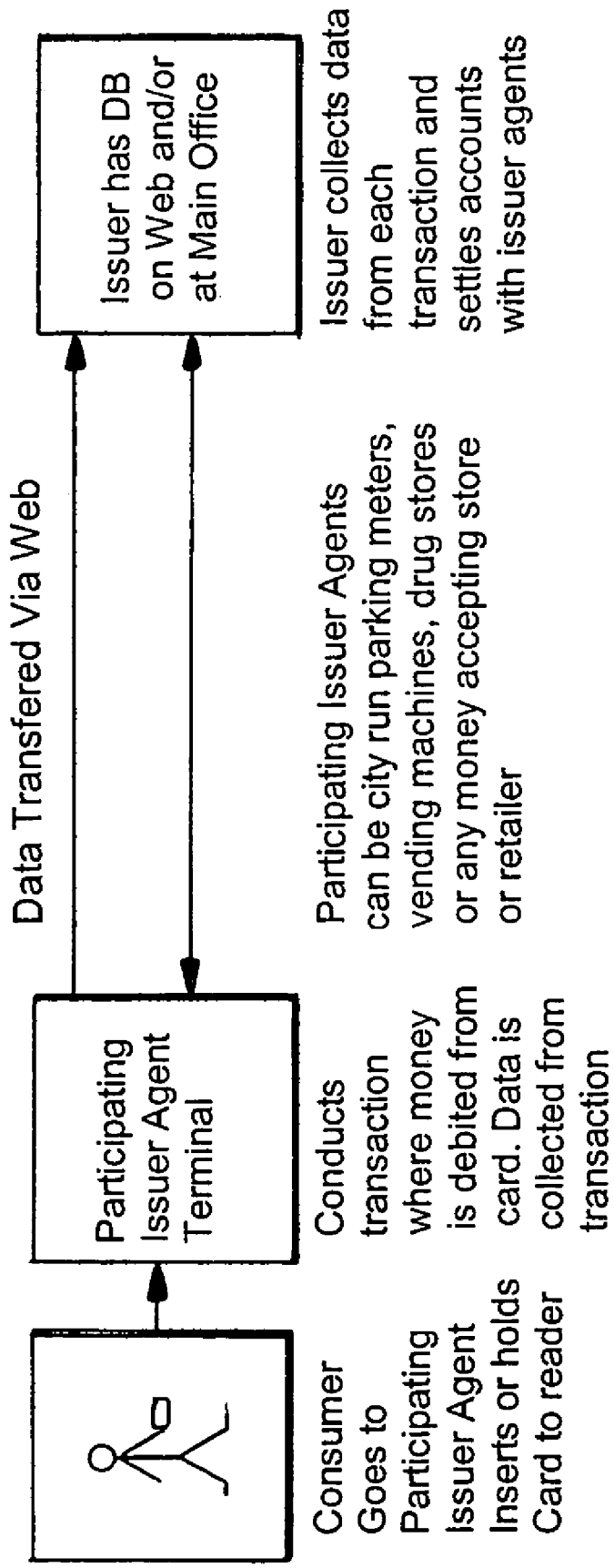
FIG. 4 schematically depicts how the customer uses the data storage card as a debit card.

Alternatively, the data storage card could be used as a debit card (FIG. 4) and read by a reader at a participating agent such as a pay telephone or parking meter which would then deduct part or all of the accumulated value in order to satisfy a debt, e.g., a charge for a telephone call or a parking fee. Also, the participating agent could be a vending machine or merchant.

When the accumulated value on the data storage card reaches a predetermined amount, that value (balance) could generate interest at a selected rate.

The present invention enables a customer to accumulate and spend change without ever touching the change itself. Eliminated is the need for the customer to store and transport coins to be redeemed or spent, and the accompanying risk of losing the coins. Merchants will not have to keep as many coins on-hand, and possibly the government will need to mint fewer coins.

The voucher dispenser could receive information as a to the accumulated amount of credited change directly from the merchant, e.g. via land line, radio frequency, web etc.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. In a method for conducting a monetary transaction wherein a user is owed change at an establishment, comprising the steps of:
   A) causing a data storage card of the user to be read by a reader at the establishment;
   B) causing the user to be credited with some or all of the change that is owed the user and recording the credited change by using the data storage card; and
   causing the data storage card to be read at a voucher dispensing machine, and causing the machine to dispense a voucher for at least a portion of the credited value.

2. The method according to claim 1 wherein the data storage card comprises an electronically readable data storage card.

3. The method according to claim 1 wherein the data storage card comprises a magnetically readable data storage card.

4. The method according to claim 1, wherein step B comprises transmitting from the establishment a signal representative of the amount credited in step B, to a data storage facility remote from the establishment.

5. The method according to claim 4 wherein the signal is transmitted by cell phone.

6. The method according to claim 4 wherein the signal is transmitted by radio frequency.

7. The method according to claim 1 wherein steps A and B are repeated, whereby the credited change accumulates by using the data storage card.

8. The method according to claim 7 further comprising using the data storage card as a debit card at a participating issuer agent.

9. The method according to claim 1 further comprising the step of deducting a percentage of the redeemed amount as a card-user fee.

10. The method according to claim 1 further comprising the step of presenting the voucher at an establishment to conduct a monetary transaction.

11. The method according to claim 1 further comprising the step of presenting the voucher to a redeeming agent and receiving cash for at least some of the credited value.

12. The method according to claim 1 where the user is a customer at a merchant's establishment.

13. In a method of conducting a monetary transaction wherein a user is owed change at an establishment, comprising the steps of:
   A) causing a data storage card of the user to be read by a reader at the establishment to identify the user;
   B) causing the user to be credited with some or all of the change that is owed and recording the credited change by using the data storage card;
   C) transmitting from the establishment a signal representative of the amount credited in step B, to a data storage facility remote from the establishment;
   D) repeating steps A, B and C to cause credited change to accumulate by using the card;
   E) causing the data storage card to be read by a reader of a voucher dispensing machine which is in data communication with the data storage facility; and
   F) causing the voucher dispensing machine to dispense a voucher for at least a portion of the credited value.

14. The method according to claim 13 wherein the user is a customer at a merchant's establishment.

15. In a method for conducting monetary transactions comprising the steps of:
   A) a user paying for the transaction with cash;
   B) the user presenting a data storage card at a first site where the money is owed and causing the data storage card to be read by a first reader at the first site;

C) causing the user to be credited with some or all of the money that is owed the user at the first site and recording the credited money by using the data storage card.

16. The method of claim 15, further comprising

D) the user presenting the data storage card at a remote second site where the user owes money and causing the data storage card to be read by a second reader at the second site; and E) causing at least some of money credited by using the data storage card to be deducted by using the data storage card in at least partial payment of the debt owed at the second site.

17. The method of claim 15, further comprising

D) transmitting from the establishment a signal representative of the amount credited in step B, to a data storage facility remote from the establishment;

E) repeating steps A, B and C to cause credited change to accumulate by using the card; and F) using the data storage card as a debit card at a participating issuer agent.

18. The method according to claim 15, wherein information regarding the transaction is transferred to a central storage facility.

* * * * *